Patented July 11, 1933

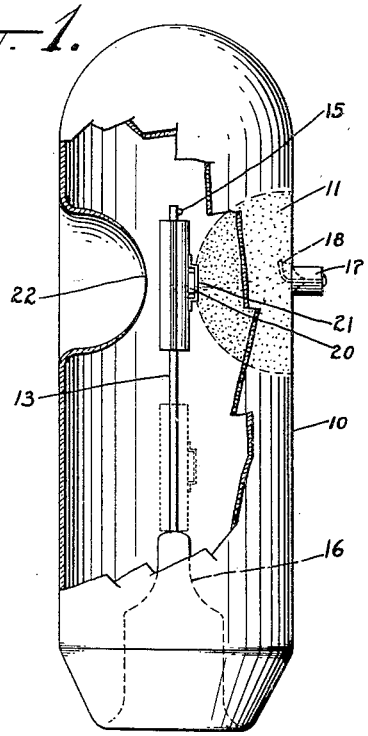
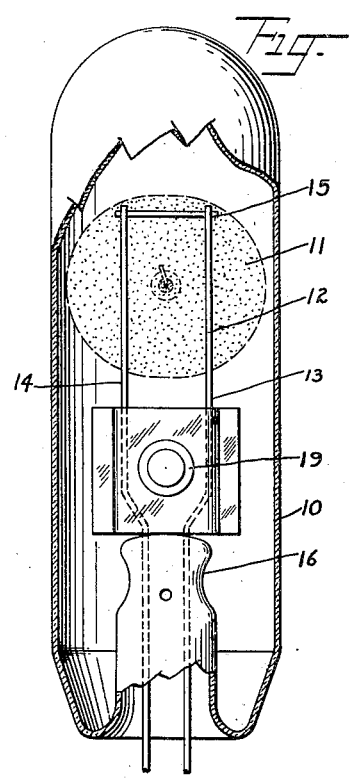
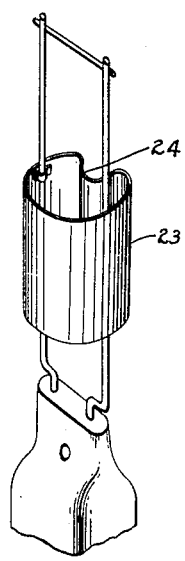
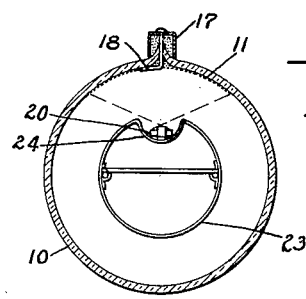
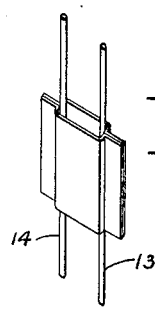

1,917,855

UNITED STATES PATENT OFFICE

HARVEY CLAYTON RENTSCHLER, OF EAST ORANGE, NEW JERSEY, ASSIGNOR TO WESTINGHOUSE LAMP COMPANY, A CORPORATION OF PENNSYLVANIA

PHOTO-ELECTRIC TUBE

Application filed May 6, 1929. Serial No. 360,667.

This invention relates to a photo-electric tube and more particularly to such a tube which is sensitive only to radiations in the blue and ultra-violet regions of the spectrum. In general, photo-electric activity is of two types, "normal" and "selective". For substances which show only a "normal" photo-electric effect, the specific photo-electric activity increases continuously as the wave length diminishes; whereas with substances which show a "selective" photo-electric effect, the specific photo-electric activity rises to a maximum value for a particular wave length, which may be termed the critical wave length. In either case, a certain minimum frequency or maximum wave length is necessary, for a specific metal, to produce any liberation of electrons at all. As the wave length decreases the emission increases until the critical wave length is reached for "selectively" active metals or continuously for metals showing "normal" activity.

Heretofore the metals ordinarily employed as the photo-sensitive cathode for photo-electric tubes have been the alkali metals, such as caesium, rubidium, potassium, and sodium. These metals show a "selective" photo-electric effect having a maximum value for a particular wave length in the visible region of the spectrum. "Selective" sensitivity in the red region of the spectrum may be obtained by using a sub-oxide of caesium, but in the ultra-violet region no materials have been found having the same order of "selective" sensitivity as the alkali metals or caesium sub-oxide in their respective sensitive regions. Cadmium has been employed for photo-electric tubes responsive only to ultra-violet radiations, but the photo-electric effect obtained with this material is so feeble that it can be detected only with a sensitive electrometer or electroscope.

The materials heretofore employed for photo-electric tubes showing a "normal" photo-electric effect are sensitive to both visible and ultra-violet light and hence are not useful for measuring the ultra-violet and near ultra-violet light, to the exclusion of the visible light of longer wave lengths.

The alkali metals, moreover, due to their low melting point, are not uniform in operation and when subject to an intense light source may be overheated with a partial volatilization of the active alkali metal deposit.

It is one of the objects of the present invention to provide a cathode for a photo-electric tube which is substantially non-volatile under the operating conditions of the tube.

Another object is to produce a photo-electric tube in which the sensitivity of the tube starts in the blue region of the spectrum and extends into the ultra-violet but which is not sensitive to radiations of higher wave lengths.

Another object is to produce a photo electric tube sensitive only to wave lengths below about 4500 Angstrom units, in which the photo-electric effect will be strong.

Another object is to provide an improved method of producing a photo-sensitive electrode.

Other objects and advantages will hereinafter appear.

I have discovered that the metals of the cerium group of rare earth metals, when employed as the cathode of a photo-electric tube, are extremely sensitive in the blue and ultra violet regions of the spectrum but are not affected by radiations of higher wave lengths, and in accordance with my invention I employ misch metal, which is a mixture of the cerium group metals, as the cathode of a photo-electric tube, the envelope of which is composed of a glass transparent to light in the blue and ultra-violet regions of the spectrum.

The misch metal or other cerium group metal is vaporized on to a wall of the envelope, adjacent the cathode leading-in wire, preferably after the tube has been completely exhausted. If desired the envelope adjacent the cathode lead wire may be previously coated with a noble metal, such as gold, before the vaporization of the misch metal, in order to obtain better electrical contact with the terminal.

If it is desired to restrict the photo-electric action only to light in the blue and violet regions of the spectrum, the envelope may be composed of a glass such as ordinary lime glass which is not transparent to ultra-violet light. Such a tube will respond only to a narrow band of the spectrum and may be employed for determining the quantity of light from a given source in this particular range.

The misch metal is preferably applied to a metallic carrier member within the envelope which is capable of being heated by high frequency induction currents for the purpose of vaporizing the misch metal. This metal carrier member is constructed so that after formation of the active cathode it may be moved to a portion of the envelope where it will not obstruct the operation of the device.

If desired the carrier for the misch metal may be constructed so as to direct the vaporized metal on to a restricted portion of the envelope and thus shield other portions thereof from the coating.

In order that the invention may be more fully understood reference will be had to the accompanying drawing in which, Fig. 1 is an elevational view partly in section of a photo-electric tube embodying my invention.

Fig. 2 is an elevational view partly in section of the photo-electric tube shown in Fig. 1, the figure being taken at 90° to that of Fig. 1.

Fig. 3 is a perspective view of the carrier for the photo-sensitive material.

Fig. 4 is a perspective view of a modified form of carrier for the misch metal, and Fig. 5 is a plan view of the mount construction shown in Fig. 4 with a surrounding envelope shown in section.

The photo-electric tube shown in Figs. 1 and 2 comprises an envelope 10 having a cathode 11 and anode 12 therein. The anode consists of a metal frame comprising two parallel uprights 13 and 14 and a bracing cross member 15. The upright members 13 and 14 are sealed in the press 16 of the tube.

The cathode 11 comprises a thin coating of misch metal deposited upon the wall of the envelope and connected to an external terminal 17 by means of a wire 18 sealed through the side wall of the envelope. A movable carrier for the misch metal prior to its deposition on the envelope, is mounted upon the framework 12.

This carrier may take variety of forms but should be of such form that it can be readily heated by high frequency induction currents from the exterior of the envelope in the form shown in Figs. 1, 2 and 3 comprising a hollow tubular plate member 19 disposed around the framework 12 so that it may be readily slid from one end to the other thereof and on one face thereof is mounted a strip of misch metal 20 secured thereto by means of a strap 21 welded to the carrier.

In the manufacture of the tube the cathode lead 18 is sealed in the wall of the envelope and the anode mount also is sealed therein. The tube is then baked out and exhausted and the carrier member 19 moved to the position shown in Fig. 1 in full lines and heated by a high frequency induction coil placed around the envelope. This heating is continued until an appreciable layer of misch metal has been vaporized from the carrier on to the wall of the envelope.

If desired, prior to sealing of the mount into the envelope, the envelope may be coated adjacent the leading-in wire 18 with a metal such as gold, to produce a good electrical contact between the subsequently vaporized misch metal and the leading-in wire 18. This gold coating may be applied by painting with liquid bright gold, drying for a few minutes at about 150° C. and then baking for 10 to 15 minutes at a temperature of around 500° C. During the baking a stream of air should be maintained through the bulb to carry away the volatilized material given off from the coating. Obviously, other methods of forming the gold deposit may be employed.

After the cathode has been formed, the misch metal carrier 19 is moved to the position shown in full lines in Fig. 2 and the tube sealed off.

The envelope 10 must be composed of a glass which is transparent to light in the region which it is desired to measure and in order to decrease the absorption of the ultra-violet light in the glass a thin window 22 may be formed in the envelope opposite the cathode 11. The window 22 is formed by heating a portion of the envelope and drawing-in such portion to form a reentrant bulbous portion having a thin dome.

Such a window increases the current output of the tube very greatly, particularly in the lower wave length regions of the spectrum, the total increase in photo-electric current from the tube, when subjected to a strong source of ultra-violet light, such as a mercury arc, being several times greater than when the window is not employed.

In Figs. 4 and 5 the carrier member for the misch metal is shown as a cylinder 23 having one side thereof concave, as at 24, in the concavity of which the misch metal 20 is secured. By means of this construction the misch metal is directed onto a restricted area of the envelope and greater uniformity obtained in the total area of the cathode.

If desired a gaseous filling of a rare gas, such as argon, neon, or helium of a suitable pressure may be employed.

A photo-electric tube produced in accordance with this invention is practically non-sensitive to light in the visible spectrum, the photo-electric effect starting in the blue region thereof, and extending into the ultra-violet region.

It is to be understood of course that many changes may be made in the construction of the tube without departing from the invention and I do not desire to be limited except in accordance with the appended claims.

What is claimed is:

1. An electron discharge device comprising an envelope transparent to ultra-violet light, a leading-in wire sealed through a wall of said envelope, an anode opposite said leading-in wire and a photo sensitive cathode, said cathode comprising a deposit of a metal of the cerium group of rare earth metals, on said envelope, in contact with said leading-in wire.

2. An electron discharge device comprising an envelope, an anode and a photo sensitive cathode therein, said cathode being composed of a metal of the cerium group of rare earth metals, and a window in said enevelope opposite said cathode, more transparent to ultra-violet light than the remainder of the envelope.

3. An electron discharge device comprising an envelope, an anode and a photo sensitive cathode therein, said cathode being composed of misch metal, and a window in said envelope opposite said cathode, said window being thinner than the remainder of the envelope and being comprised substantially of glass permeable to radiation having wave lengths below approximately 4500 Angstrom units.

4. An electron discharge device comprising an envelope, an anode and a photo sensitive cathode therein, said cathode being composed of a metal of the cerium group of rare earth metals, and said envelope being comprised of material permeable to radiation having a wave length below approximately 4500 Angstrom units and having a relatively thin bulbous window formed in said envelope opposite said cathode.

5. A photo-electric tube comprising an envelope transparent to ultra-violet light, a coating of a noble metal on a portion of the wall of said envelope, a quantity of misch metal deposited on said noble metal, constituting a cathode for the tube, an anode and a thin vitreous window in the wall of the envelope opposite said cathode.

6. The method of producing a photo-electric tube comprising sealing a leading-in wire into a wall of the envelope, mounting an anode and a movable carrier member for photo-sensitive material in said envelope, exhausting the envelope, moving the carrier member to a position opposite said leading-in wire, heating the carrier member to vaporize the photo-sensitive material therefrom onto the wall of the envelope adjacent said leading-in wire, and moving said carrier member to position remote from said leading-in wire.

7. The method of producing a photo-electric tube comprising, sealing a leading-in wire into a wall of the envelope, coating said wall adjacent the leading-in wire with a noble metal sealing an anode into the envelope, exhausting the envelope and vaporizing a metal of the cerium group of rare earth metals onto said noble metal while protecting other portions of the envelope from said rare earth metal.

8. The method of making a photo-sensitive electrode for a photo-electric tube comprising mounting a quantity of the photo-sensitive material on a metal plate, sealing said plate into an envelope, moving the plate to a predetermined position within the envelope, heating the plate to vaporize a portion of the photo-sensitive material onto a restricted portion of the envelope to form a photo-sensitive electrode and then moving said metal plate to a position remote from said electrode.

9. A photo-electric tube comprising an envelope, an anode therein, a movable plate mounted on said anode, and a quantity of a photo-sensitive material mounted on said plate, said plate being shaped to direct said photo-sensitive material onto a restricted portion of the envelope, when the plate is heated to the vaporization temperature of the photo-sensitive material.

10. An electron discharge device comprising an envelope, permeable to radiations having wave lengths below approximately 4500 Angstrom units, an anode and a photo-sensitive cathode therein, said cathode being composed of misch metal.

11. An electron discharge device comprising an envelope, permeable to radiations having wave lengths below approximately 4500 Angstrom units containing an anode and a photo-sensitive cathode, said cathode being composed of a metal of the cerium group of rare earth metals.

12. An electron discharge device comprising an envelope, permeable to radiations having wave lengths below approximately 4500 Angstrom units, containing an anode and a photo-sensitive cathode, said cathode consisting of a coating of gold on the envelope, said coating having a metal of the cerium group of rare earth metals thereon.

In testimony whereof, I have hereunto subscribed my name this 3rd day of May, 1929.

HARVEY CLAYTON RENTSCHLER.